United States Patent [19]

Csongor

[11] Patent Number: 4,749,279

[45] Date of Patent: Jun. 7, 1988

[54] MODULAR MIXING APPARATUS FOR EXTRUDED MATERIAL INCLUDING ROTARY FOR PROCESSING MODULES HAVING VARIABLE SPEED INDEPENDENT DRIVE MEANS

[75] Inventor: Desider G. Csongor, Rangeley, Me.

[73] Assignee: Northern Lights Trust of February 14, 1978, Rangeley, Me.

[21] Appl. No.: 802,960

[22] Filed: Nov. 29, 1985

Related U.S. Application Data

[63] Continuation of Ser. No. 582,329, Feb. 22, 1984, abandoned, which is a continuation-in-part of Ser. No. 298,065, Aug. 31, 1981, Pat. No. 4,447,156.

[51] Int. Cl.$^4$ .......................... B01F 7/08; B29B 1/06
[52] U.S. Cl. .......................... 366/80; 366/82; 366/90; 366/312; 366/322; 425/208; 425/209
[58] Field of Search ................ 366/79–82, 366/83–86, 91, 87, 90, 96–99, 100, 318, 319, 322, 324; 425/207–209, 203, 205, 113; 264/174, 176 R, 349

[56] References Cited

U.S. PATENT DOCUMENTS

| | | |
|---|---|---|
| 1,487,208 | 3/1924 | Cooke . |
| 3,102,717 | 9/1963 | Frenkel . |
| 3,174,185 | 3/1965 | Gerber . |
| 3,936,038 | 2/1976 | Olmsted . |
| 3,942,774 | 3/1976 | Sokolow . |
| 3,977,658 | 8/1976 | Wittrock et al. ........... 366/325 X |
| 4,003,521 | 1/1977 | Hess . |
| 4,128,342 | 12/1978 | Renk . |
| 4,155,655 | 5/1979 | Chiselko et al. .............. 366/88 X |
| 4,253,771 | 3/1981 | Renk . |
| 4,330,215 | 5/1982 | Gale . |
| 4,347,003 | 8/1982 | Anders ........................ 366/91 X |
| 4,408,887 | 10/1983 | Yamaoka . |
| 4,447,156 | 5/1984 | Csongor ........................ 366/80 |

FOREIGN PATENT DOCUMENTS

| | | |
|---|---|---|
| 2162709 | 6/1973 | Fed. Rep. of Germany . |
| 1215358 | 4/1960 | France . |
| 787764 | 12/1957 | United Kingdom . |
| 841743 | 7/1960 | United Kingdom . |
| 930339 | 7/1963 | United Kingdom . |
| 1345531 | 1/1974 | United Kingdom . |
| 1475216 | 6/1977 | United Kingdom . |

OTHER PUBLICATIONS

Gale, G. M., New Techniques for Polyolefin Estrusion Using Carbon Black Masterbatch and Liquid Colors, 1980, ANTEC, pp. 69–70, Rubber and Plastics Research Association, Shawbury, Shrewsbury, England.

*Primary Examiner*—Timothy F. Simone
*Attorney, Agent, or Firm*—Hamilton, Brook, Smith & Reynolds

[57] ABSTRACT

In a copending application Ser. No. 298,065 filed Aug. 31, 1981 modular mixing apparatus has been disclosed combined with a barrel and main power driven extruder screw and the mixing apparatus is necessarily required to be at the same speed as the main power driven extruder screw and operates through a common barrel member.

In the present invention improved modular mixing apparatus has been constructed and arranged to operate with independent drive means for rotation in a separate stationary sleeve member and extruded material leaving the main extruder screw and barrel is introduced into the mixing module. The mixing apparatus may, in this form, be driven at variable speeds which are independent of the speed of the main extruder screw.

The improved modular mixing apparatus of this invention also includes a newly devised shearing lug module. The shearing lug module produces greatly attenuated subdivision of material obtained by the use of shearing lugs operating in combination with annular shearing channels formed in the stationary sleeve member. The shearing lug module combined with a basic component assembly of the invention may find application, in dealing with some materials, as a single processing module only especially when driven at suitably increased speeds of rotation. It should also be understood that the shearing lug module may be driven by a conventional extruder screw in some desired instances.

12 Claims, 16 Drawing Sheets

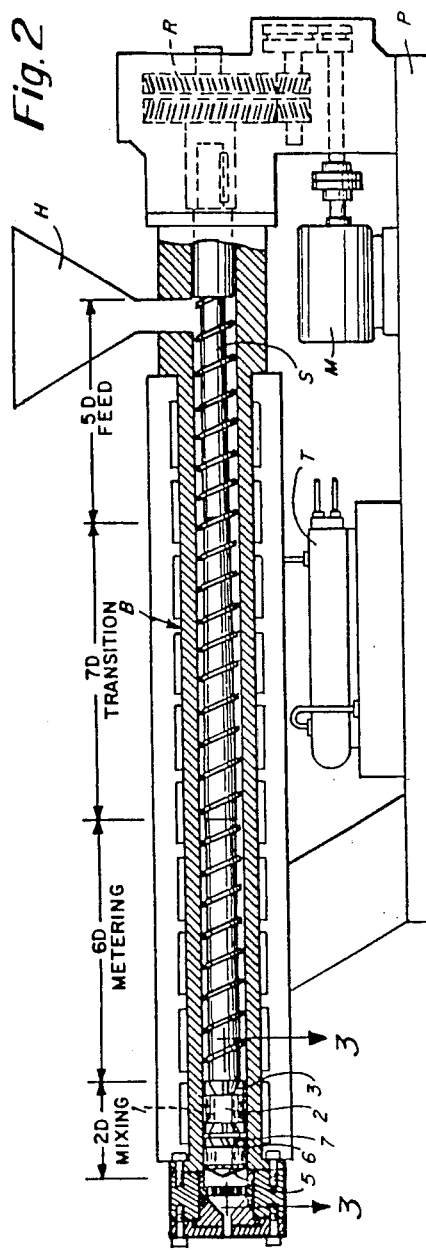
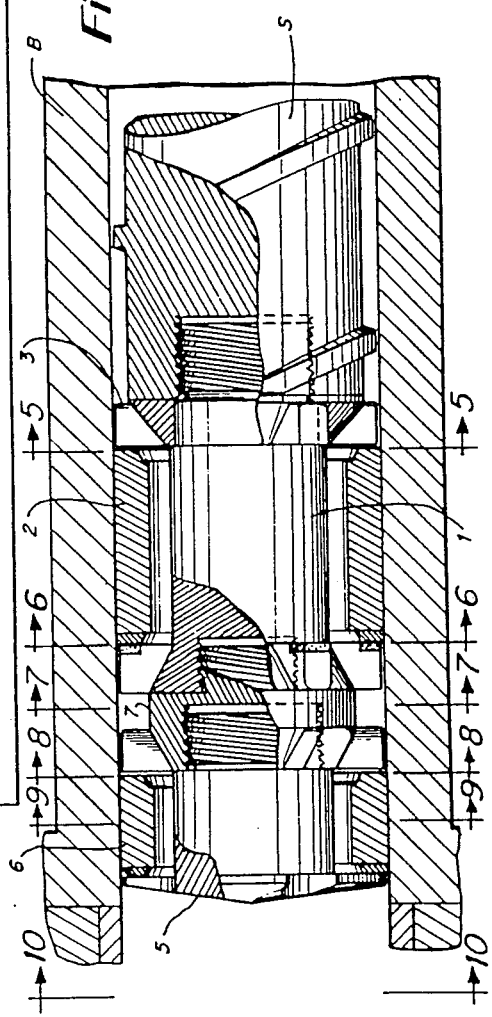

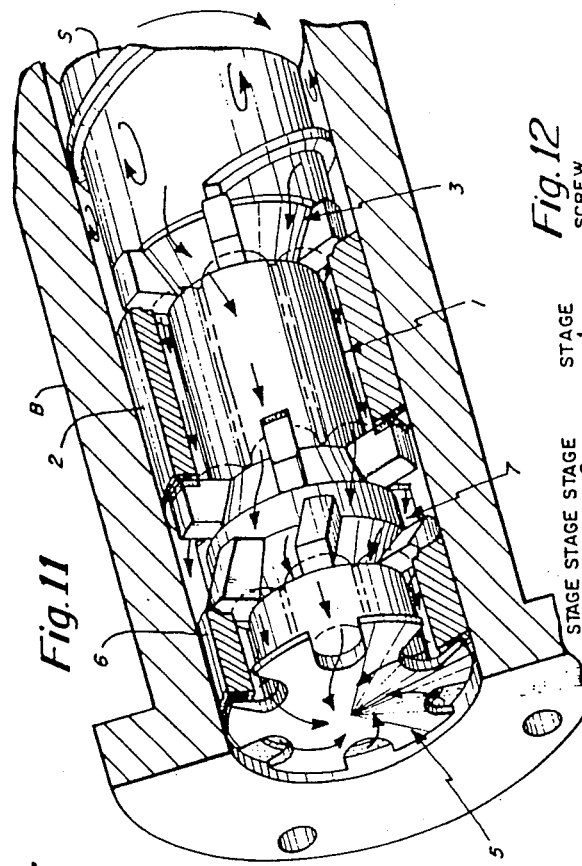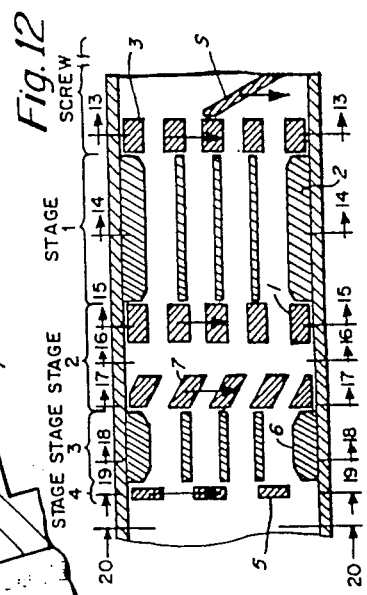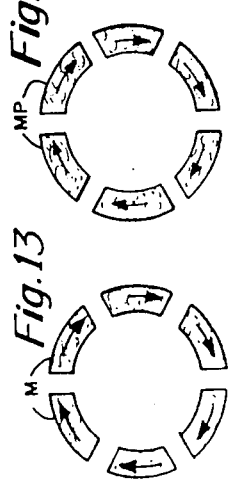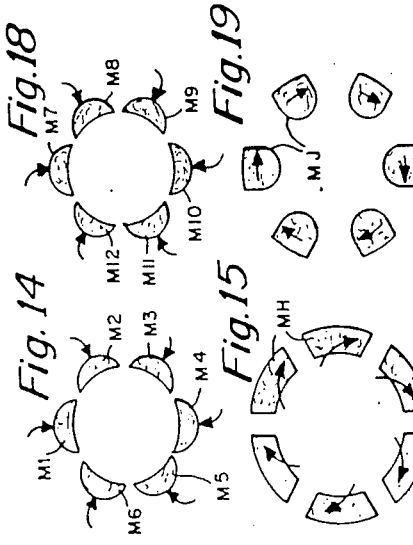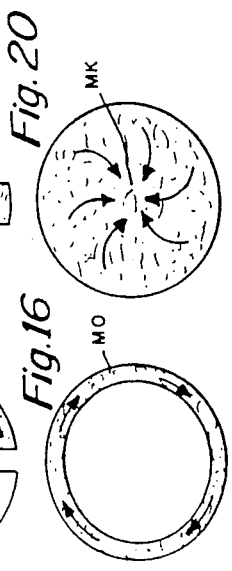

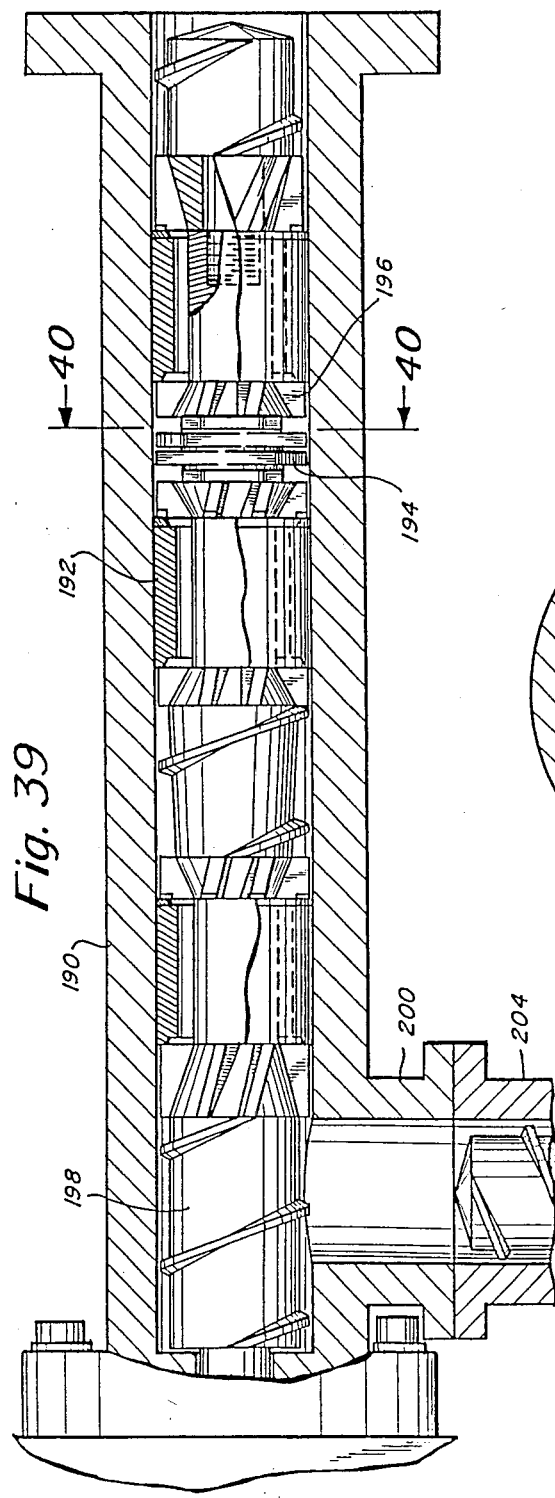
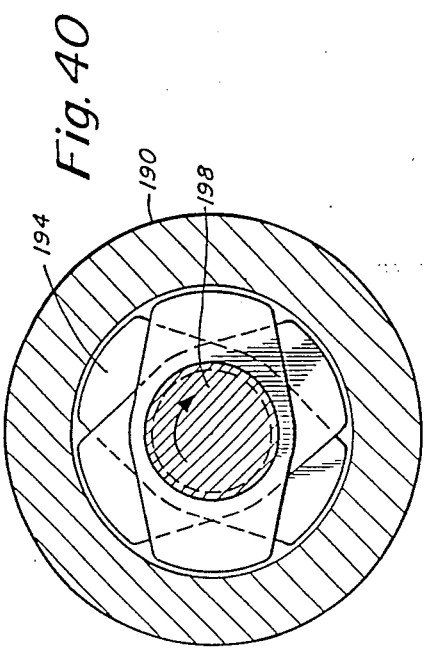

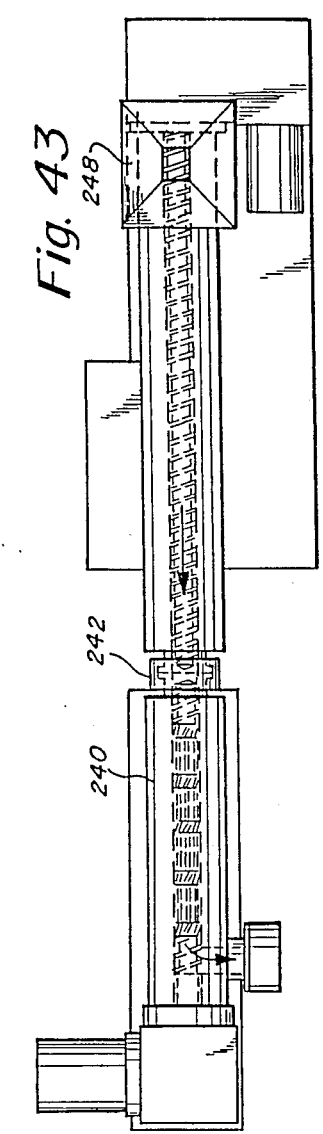
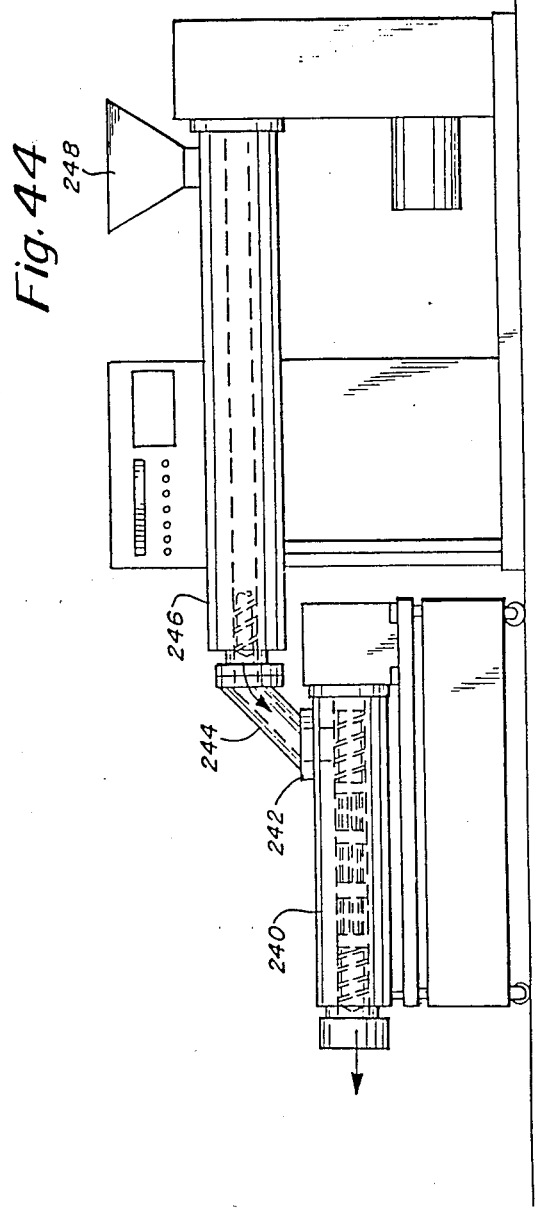
Fig. 43
Fig. 44

MODULAR MIXING APPARATUS FOR EXTRUDED MATERIAL INCLUDING ROTARY FOR PROCESSING MODULES HAVING VARIABLE SPEED INDEPENDENT DRIVE MEANS

This is a continuation of co-pending application Ser. No. 582,329 filed on Feb. 22, 1984, abandoned, which is a continuation-in-part of application Ser No. 298,065, filed Aug. 31, 1981, U.S. Pat. No. 4,447,156.

FIELD OF THE INVENTION

Mixing a fluid or plastic mass with modifying agents, additives and the like to produce a homogeneous material is customarily attempted by mixing apparatus which is well known in the art and occurs in various forms. Conventional extruder screw and barrel apparatus is employed either separately or in conjunction with static flow diverting means. These conventional mixers and extruders are all shear dependent in that flow of plastic material may become channelized with hotter, less viscous material tending to run in channels along the central axis of the extruder section and cooler, more viscous material tending to adhere to extruder barrel portions at some points.

For example, with a conventional extruder screw having 24 turns, only 80% of the material may be melted by the first 12 turns, and the remaining 12 turns may produce only a 95% melt. Periodically the more viscous or unmelted material may become torn away from the barrel and swept into the die in which forming is to take place. To prevent this, more heating and pressure is ofter exerted through the extruder screw with excessive use of energy and undesirable increase in temperature of material in the barrel which can degrade some portions of the material. Thus the need exists for more complete melting and mixing which can be carried at localized points at variable rates of speed to deal with these difficulties and prevent lack of homogeneity in the mold product.

SUMMARY OF THE INVENTION

It is a chief object of the invention to provide a rotary modular mixing apparatus which is independently driven to provide for either constant or variable speeds of rotation.

Another object of the invention is to devise independently driven modular mixing apparatus having a plurality of rotating shear ring means combined with a stationary sleeve element by means of which laminar displacement of a fluid material is achieved.

Another object is to provide for separating laminar displaced material into spaced apart streams of material, each of which streams may be driven at variable or constant speeds of rotation to become cut off and undergo additional laminar displacement.

Still another object of the invention is to combine with a main extruder screw and barrel a sleeve member for receiving extruded material leaving the barrel and moving the extruded material in a helical path of travel about an axis which extends transversely with respect to the axis of the main extruder screw.

Another object is to provide variable speed means for retrofitting an extruder where an appreciable percentage of relatively viscous or unmelted materials resist mixing and blending and require intensive extruder processing.

It has been determined that the foregoing objectives can be realized by means of independently driven processing modules and moving at constant or variable rates of speed to produce laminar displacement of a fluid mass is thereafter guided in separated streams along undulating linear paths of travel of relatively short axial length.

The combined effect of laminar displacement of fluid material at variable or constant speeds followed by travelling the displaced material along undulating linear paths of short axial length to undergo further laminar displacement, operates to achieve a high degree of intimate mixing and blending by which substantially all material in the fluid mass which is not in a fluid state is converted into a part of a homogenous product.

BRIEF DESCRIPTION OF THE DRAWINGS

FIG. 2 is a diagrammatic view of conventional plastic processing apparatus including an extruder screw, an extruder barrel and portions of a die shown in cross section with which a modular mixing apparatus of the invention is combined.

FIG. 3 is a cross section taken on the line 3—3 of FIG. 2.

FIG. 11 is a fragmentary perspective view showing the component parts of the mixing apparatus of FIGS. 2 and 3 and indicating portions of a barrel member having been broken away to indicate by arrows a changing flow of material along undulating parhs of travel of short axial length.

FIG. 12 is a fragmentary cross sectional view showing portions of the mixing apparatus and indicating rotational direction of the various modules.

FIG. 13 is a cross sectional view taken on the line 13—13 of FIG. 12 illustrating diagrammatically one path of flow of fluid material.

FIGS. 15, 16, 17, 18, 19 and 20 are additional views similar to FIG. 13 but taken on respective cross sectional lines 15—15, 16—16, 17—17, 18—18, 19—19 and 20—20.

FIG. 39 is a detail cross sectional view of additional modules independently driven.

FIG. 40 is a detail cross sectional view taken on the line 40—40 of FIG. 39.

FIG. 43 is a plan view of an extruder screw barrel similar to those shown in FIGS. 1-23, but clamped to the extruder barrel output end and provided with indendependent means.

FIG. 44 is a view similar to FIG. 43 but having a single connection.

DETAILED DESCRIPTION OF THE INVENTION

The modular mixing apparatus of the invention may be operated at a constant speed of rotation which depends upon the speed of rotation of an extruder screw and operation may also be carried out at variable speeds of rotation where independent power driving means are employed.

FIGS. 1-23 illustrate processing modules of the constant speed form and FIGS. 24-40 illustrate the processing modules which include independent drive means for employing variable speeds of rotation.

Desirable mixing results are obtained with either dependent drive or independent drive. In all forms of the invention, whether dependent or indedependent, laminar displacement of materials is carried out employing a basic component assembly of modules including a shaft, spaced apart shear rings rotable with the shaft and a stationary sleeve located between the shear ring elements in abutting relation therewith. In some mixtures of material greater difficulty may be experienced in obtaining sufficient degree of attenuation due either to need for greater heating, pressure, size of particle, etc. and in such cases variable speeds of rotation of the processing module may be a function of a specific product mix.

Figure 1:
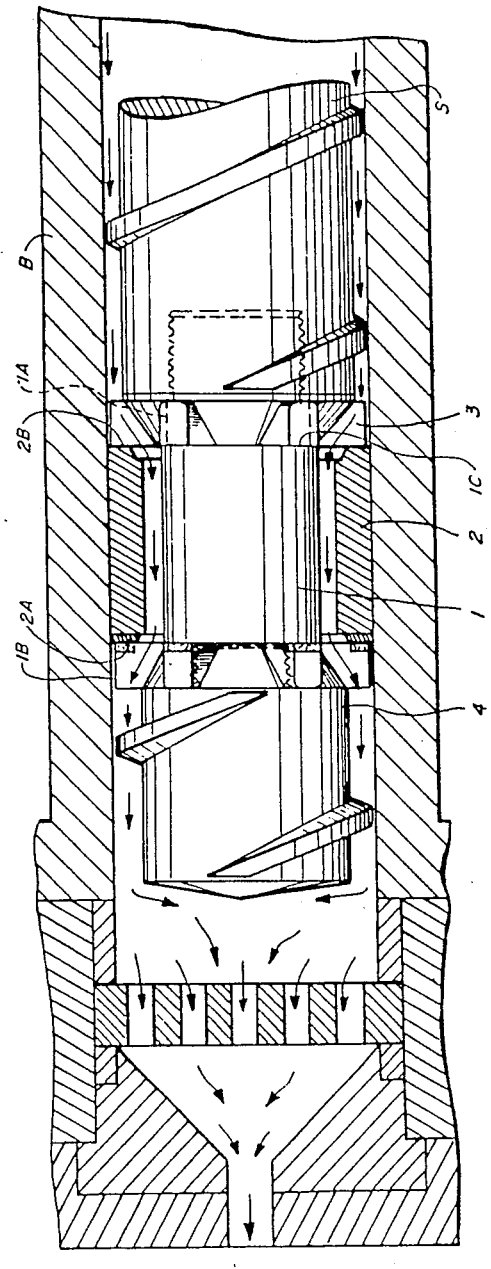
FIG. 1 is an elevational view illustrating a basic component assembly of one desirable form of modular extruder apparatus of the invention combined with an extruder barrel which is shown fragmentarily.

Referring in more detail to the dependent drive arrangement of FIGS. 1-23, a basic component assembly is illustrated in FIG. 1. FIGS. 2-23 illustrate other modular mixing apparatus having various processing modules combined in one form or another with the basic component assembly noted above.

The apparatus of FIG. 2 may, for example, be supported on a bed plate P and may include a feed section having a hopper H into which plastic material is furnished in the usual manner to an extruder screw S received within a barrel B and power driven through a reduction gearing R by a motor M. T denotes thermal control means in communication with the extruder barrel.

It is customary to construct extruder screws such as the screw S with a predetermined length to diameter ratio. As shown in FIG. 2 diagrammatically, screw S may have a length which is twenty times the the diameter of the screw S including a feed section of five diameters, a transition section of seven diameters, a metering section of six diameters and a mixing section of two diameters.

In this mixing section of two diameters is located the modular mixing apparatus of the invention and it should be understood that this modular mixing apparatus, as hereinafter described in detail, may be combined with an extruder screw having a length of 18 diameters or other lengths as an original construction. However, where it is desired to modify a screw having some given length such as a length of 20 diameters, or some other number of diameters, the screw may be cut to a length of 18 diameters, for example, and then retrofitted with the modular mixing apparatus of the invention by internally threading the cut off end of the screw S and attaching a reduced threaded end of the invention mixer apparatus therein.

Considering in further detail the basic component assembly shown in FIG. 1, numeral 1 denotes a main shaft having a reduced threaded extremity 1A which is securely engaged in an internally threaded end of screw S. An opposite end of main shaft 1 has integrally formed therewith a shear ring portion 1B. Located around shaft 1 in spaced relation thereto is a stationary shear control sleeve 2. This sleeve 2 is fixed against an inner peripheral surface of the barrel B. This may be accomplished, for example, by forming sleeve 2 of a metal having a coefficient of expansion greater than the coefficient of expansion of the metal in barrel B.

Sleeve 2 is also positioned with one end in abutting relation to the shear ring portion 1B. At an opposite end of sleeve 2, and in abutting relationship threwith, is a separately formed shear ring element 3 which is solidly secured between the extruder screw S and an annular shoulder portion 1C of shaft 1 and is rotatable therewith.

Figure 4:
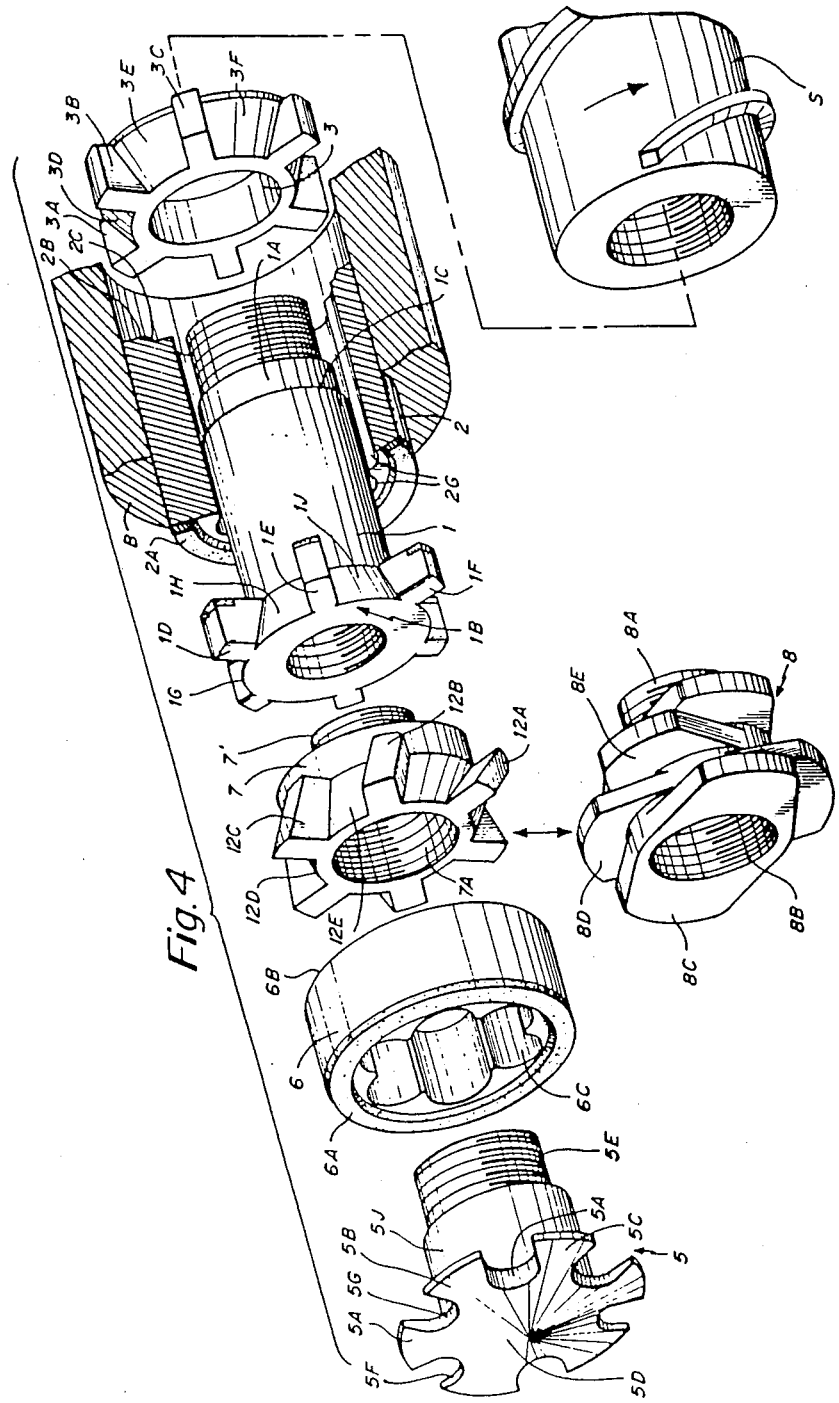
FIG. 4 is an exploded view showing in further detail the component parts of the modular extruder apparatus shown in FIGS. 2 and 3.
Figure 5:
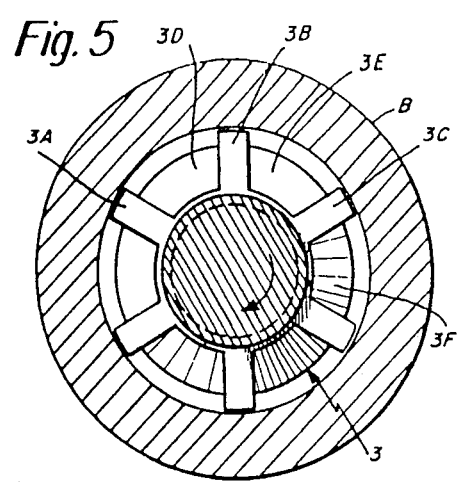
FIG. 5 is a cross section taken on the line 5—5 of FIG. 3.
Figure 6:
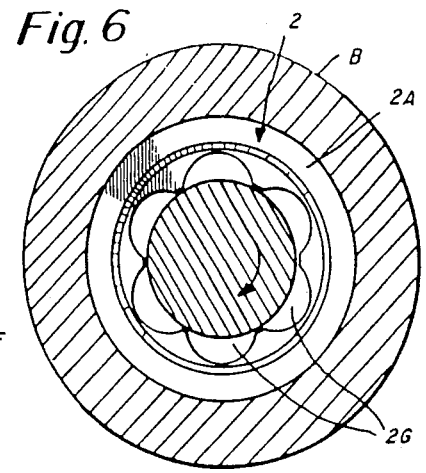
FIG. 6 is a cross section taken on the line 6—6 of FIG. 3.
Figure 7:
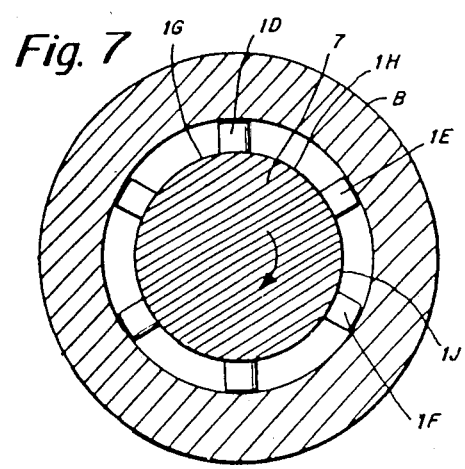
FIG. 7 is a cross section taken on the line 7—7 of FIG. 3.
Figure 8:
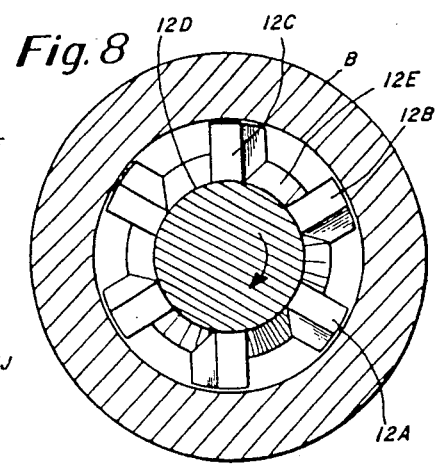
FIG. 8 is a cross section taken on the line 8—8 of FIG. 3.
Figure 21:
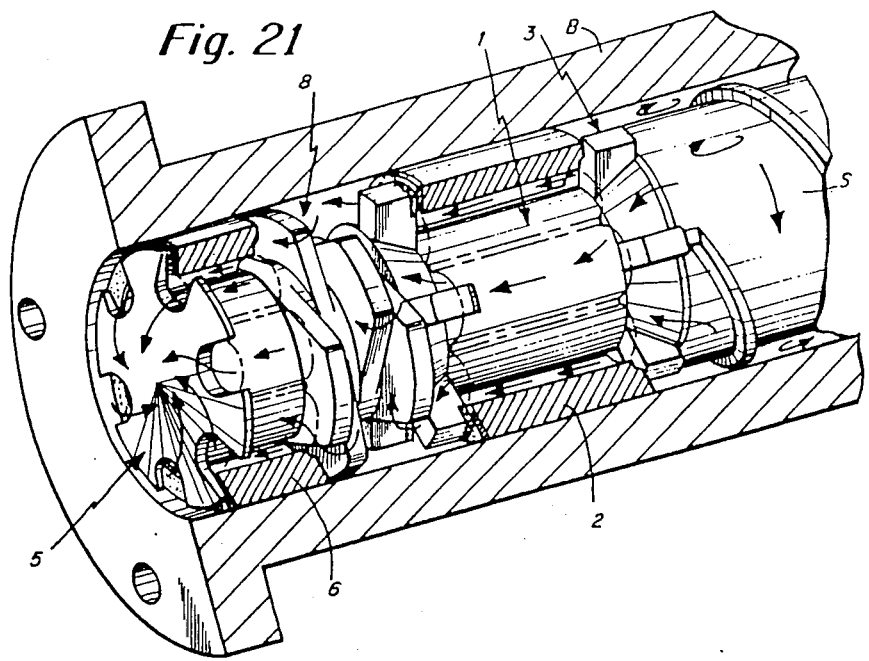
FIG. 21 is a fragmentary cross sectional view of a modified form of mixing apparatus of the invention and particularly showing the com-ination of kneading block apparatus combined with the rotating screw driver shaft.
Figure 22:
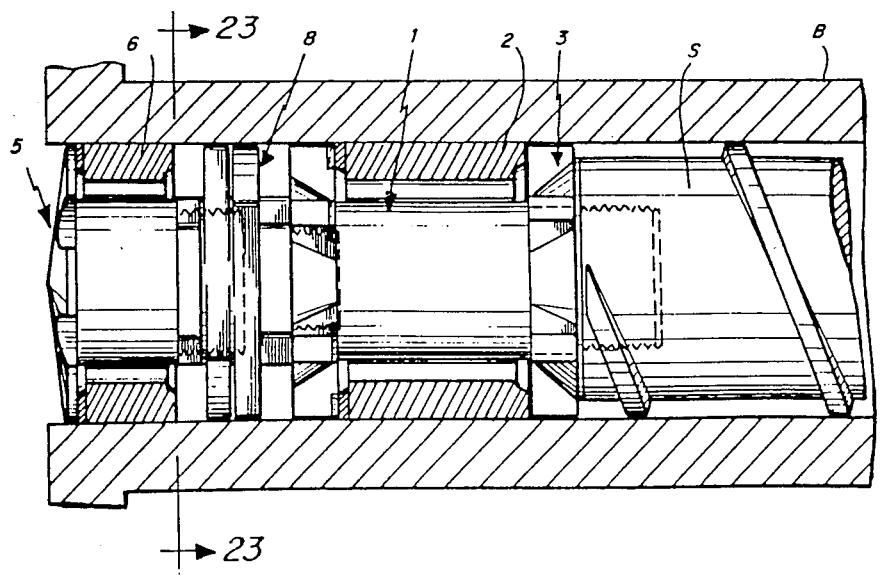
FIG. 22 is a fragmentary cross sectional view of a barrel member showing mixing apparatus of the invention corresponding to the assembly shown in FIG. 21.
Figure 23:
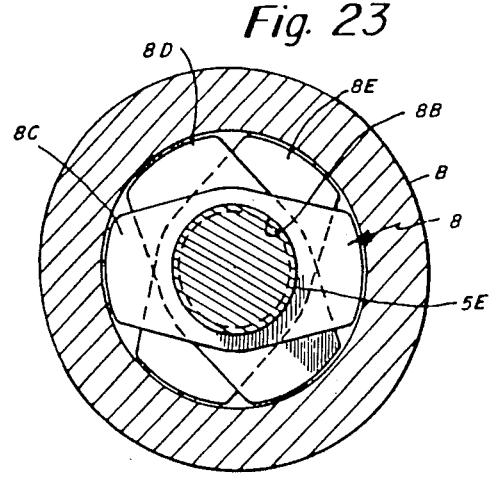
FIG. 23 is a cross section taken on the line 23—23 of FIG. 22.

This basic component assembly including the main shaft 1, sleeve 2 and shear ring means 1 and 1B is also shown in FIGS. 2, 3 and 4 combined with other modular components for another processing mode and is still further shown in FIGS. 21–23 combined with different component means and still other processing modes.

It will be understood that opposite ends of the stationary sleeve 2 will be subjected to wear when the shear ring portions 1B and separately formed shear ring 3 are beingrotated by main shaft 1. To prevent such wear the sleeve 2, in one preferred embodiment, may have opposite ends thereof provided with hardened bearing portions as 2A and 2B.

Extending inwardly of sleeve 2 and downwardly from the hardened bearing portions 2B is a conical surface 2C. Similarly, extending inwardly and downwardly from bearing 2A is another conical surface 2D. These conical surfaces are formed to provide for controlling the thickness of laminar displacement carried out by movement of the shear ring 3 and shear ring portion 1B. Increasing or decreasing the depth of these conical surfaces varies the thickness of each lamina cut off by a blade and provides a desirable range of thickness controlled.

Figure 9:
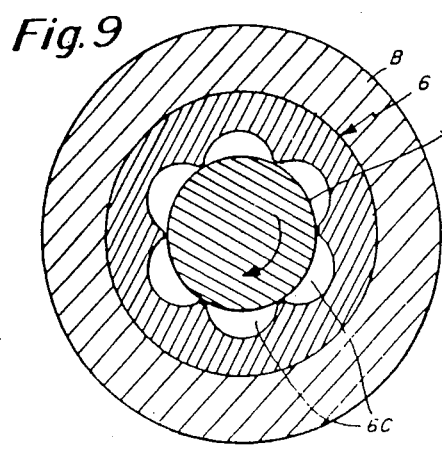
FIG. 9 is a cross section taken on the line 9—9 of FIG. 3.
Figure 10:
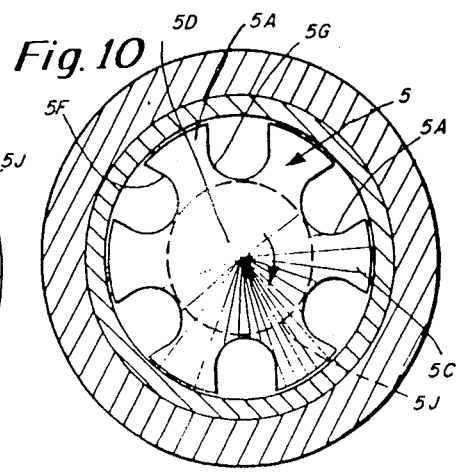
FIG. 10 is an end elevational view showing a dispersing tip element in the modular mixing apparatus.

As noted above, the sleeve 2 has an inner peripheral surface occurring in spaced relation to the main shaft 1 and this inner peripheral surface is further constructed with spaced apart axially extending grooves as 2G more clearly shown in FIGS. 4 and 9. These grooves function to receive sheared portions of fluid material cut off by the shearing blades and to provide for a plurality of streams of material being diverted and guided along a plurality of linear paths of travel between the sleeve and the shaft 1.

An important feature of the invention is the combination of a stationary sleeve having conical shear control surfaces and flow diverting grooves as described above with spaced apart shear ring means of a unique construction.

Thus, the shear ring 3 is formed with radially extending shearing blades as 3A, 3B, 3C, etc. These shearing blades are spaced apart to provide passageways through which extruded material may pass. Extending between the blades 3A, 3B, 3C, etc. are inwardly inclined sloping surfaces as 3D, 3E, 3F, etc. Similarly, the shear ring portion 1B is formed with radially extending shearing blades as 1D, 1E, 1F, etc. and are spaced apart to provide passageways for fluid flow and extending between the blades are sloping surfaces 1G, 1H, 1I, etc. which are inclined upwardly, as shown more clearly in FIGS. 4 and 11. The arrangement of parts of FIGS. 4 and 11 is also shown diagrammatically in FIG. 12.

As a result of this arrangement of parts there is realized periodically undulating flow of material which is successively interrupted to undergo laminar displacement and thereby an intensified mixing is achieved. This intensified mixing is highly effective in subdividing material which is not in a fluid state and which may tend to accumulate at points near the end of an extruder screw as indicated in FIG. 2.

In operating the apparatus of FIG. 1 a helically moving extruded mass of fluid material is advanced through the extruder barrel B by the extruder screw S and portions of the helically moving mass move into the spaces between the blades of shear ring 3. FIG. 13 illustrates the portions of material in diagra-matic form.

Immediately thereafter these portions of material are subjected to laminar displacement. The thickness of each of the laminae displaced is regulated by the depth of the conical surface 2D of sleeve 2.

Thereafter, the displaced material becomes guided along grooved surfaces of sleeve 2 as spaced apart streams of material which travel in linear paths of relatively short axial length. FIG. 14 shows diagrammatically these separated streams of material denoted by reference characters M1, M2, M3, M4, M5 and M6.

Thereafter, the streams of material are continuously subdivided by a second stage of laminar displacement carried out by shear ring portion 1B. FIG. 15 indicates diagrammatically flow of displaced material M8.

Portions of material thus subdivided are merged together in a helically moving mass MO as suggested diagrammatically in FIG. 16 and quickly undergoes another step of laminar displacement by shear ring 7, as indicated diagrammatically by portions of material MP in FIG. 17.

In the processing mode illustrated in FIG. 1 the metering module 4 discharges the finally mixed and blended product described which is shown for example at the end of the apparatus illustrated in FIG. 2.

In FIG. 4 there is illustrated a processing mode by means of which increased shearing and mixing may be carried out depending upon the material being dealt with. In this modular mixing apparatus the same component assembly is employed including the main shaft 1, sleeve 2 and shear ring means 3 and 1B.

However, in place of the metering screw 4 there is attached another shear ring member 7 having a threaded end 7' which is threaded into the internally formed threads of ring portion 1A to become rotatable therewith. The member 7 is formed with internally constructed threads as 7H and have outwardly projecting shearing blades as 12A, 12B, 12C, etc. These blades, unlike the blades of ring portion 1A, are not parallel to the central axis of the extruder screw but are skewed and extend angularly with respect to the central longitudinal axis of the ring 7.

It has been found that an acceleration flow of material may be realized by these angularly disposed blades. Also, desirable results may be obtained by combining these shearing blades with another sleeve member 6 to carry out a progressively extended stage of shearing as member 7 is rotated around the end of the sleeve 6 which has hardened the bearing portions as 6A and 6B earlier described. It will also be noted that the thickness of laminar displacement of fluid material is again regulated by conical surfaces as 6D.

Still another stage of shearing is obtained by the use of a diffuser tip 5 which has spaced apart shearing blades rotatable around the sleeve 6. The member 5 is formed with a threaded end 5E which is detachably secured in threaded relationship with member 7. The member 5 is also shaped with a conical end face and material passing through the openings denoted by arrow 5 in the extruder tip end to be forced along converging paths of travel for desirable communication with the die member.

Material passing through the blades of shear ring 7 again enter a stationary sleeve 6 and quickly undergo another step of laminar displacement by shear ring 7 and become guided along the grooved surfaces of the stationary sleeve 6 to provide spaced apart streams as suggested disgrammatically in FIG. 18 and denoted by the reference characters M7, M8, M9, M11 and M12.

A final step of laminar displacement to subdivide these streams of material is carried out by movement of the dispersing tip 5 against the stationary sleeve 6 and this provides portions as MJ indicated diagrammatically in FIG. 19. A resulting mixture MK is then led through the dispersing tip and leaves the tip as a converging stream indicated by the arrows in FIG. 20. In FIG. 21 another mode of mixing has been illustrated in which there is employed the same basic component assembly including parts 1, 2, 3, and member 7; however, in place of the shear ring 1B a kneading rotor denoted by numeral 8 which is rotatable against the stationary sleeve 6, as shown in FIGS. 21, 22 and 23. The kneading rotor component 8 is formed with a threaded end 8A and is provided with internal threads 8B. It will be noted that the kneading rotor is constructed with oblong shaped bars or arms which extend radially outward and occu in angularly disposed relationship with respect to one another, as shown in FIGS. 4, 21, 22 and 23. It has been found that a kneading and streatching of some fluid masses at this point in the processing can be carried out to provide further desirable attenuation and mixing of certain fluid materials.

Figure 24:
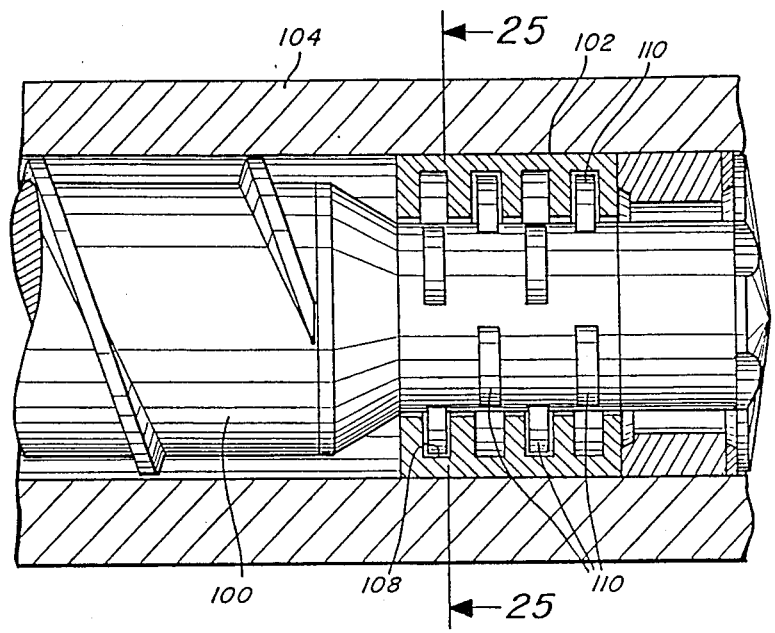
FIG. 24 is a cross sectional view illustrating an extruder member having shearing lugs and a sleeve member having annular channels in which the lugs are engageable.
Figure 25:
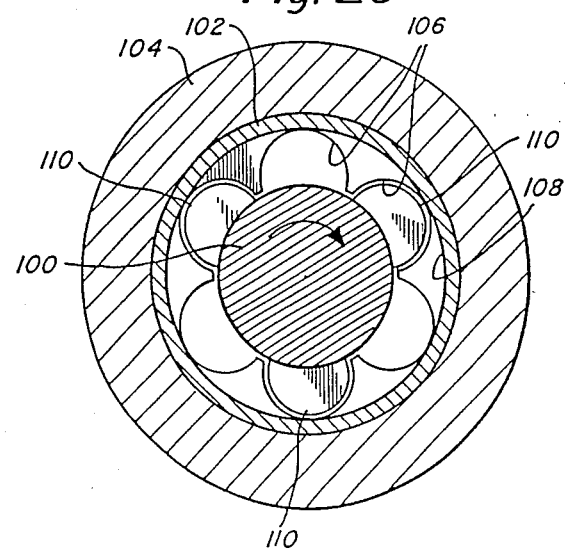
FIG. 25 is a cross section taken on the line 25—25 of FIG. 24.

Attention is next directed to the modular mixing apparatus illustrated in FIGS. 26 through 44 wherein independent drive means is provided. In FIGS. 24 and 25 there is illustrated also a newly devised embodiment of mixing module which is provided with independent drive means and which may be employed as a single module operating by itself or which may be combined with one or more of the modules earlier disclosed.

FIGS. 26 through 44 illustrate modular mixing apparatus including a plurality of modules, all of which are also provided with independent drive means.

In all of these independently driven forms of mixing a further desirable blending of material is realized by converting a mass of materials moving in a helical path about the central axis of the main extruder screw into a mass of materials moving in a helical path about an axis extending transversely to the axis of the main extruder screw. In thus diverting the flow of material, minute portions of the extruded material are stripped off and then recombined in an improved and highly desirable manner.

It is also pointed out that by driving the mixing modules independently greatly increased processing flexibility is realized. Thus if different viscosity constituents are added to the mixer and not to the main extruder many advantages may be realized relating to rendering time, curing time, sensitivity to shear, temperature employed and pressures utilized. For example, melting efficiency may be greatly improved. A positive head pressure may be utilized with minimum fluctuation and more precise mixing of constituents. Sensitity to viscosity differentials may be materially reduced and it becomes possible to use additives of either organic or inorganic nature. In the polymer processing industry mixing is achieved to an extent not heretofore realized. Mixer speed can also be controlled to accomodate melt quality or thermo homogeneity requirements. Consequently, control of a given process material or mixture does not depend on a typical extruder screw operation.

As shown in FIGS. 24 and 25, the basic component assembly includes an extruder member 100 mounted for rotation in a stationary sleeve 102 fixed inside the barrel 104. The stationary sleeve 102 is formed with internally grooved surfaces or flutes denoted by numeral 106. Portions of the stationary sleeve 102 is further recessed to form annular channels 108 in which channels are rotatably engaged, shearing lugs as 110 on the extruder member. It will be noted that the annular channels intersect internally grooved surfaces 106 and as a result rotative movement of the shearing lugs operate to cut off small sections of streams of material being forced through the internally grooved surfaces of the stationary member and further laminar displacement may take place. It is intended that the extruder 100 be independently driven by an arrangement of parts such as is illustrated in FIG. 26 and it may be also desired to have member 100 attached to a main extruder screw, as shown in FIGS. 1–23.

Figure 26:
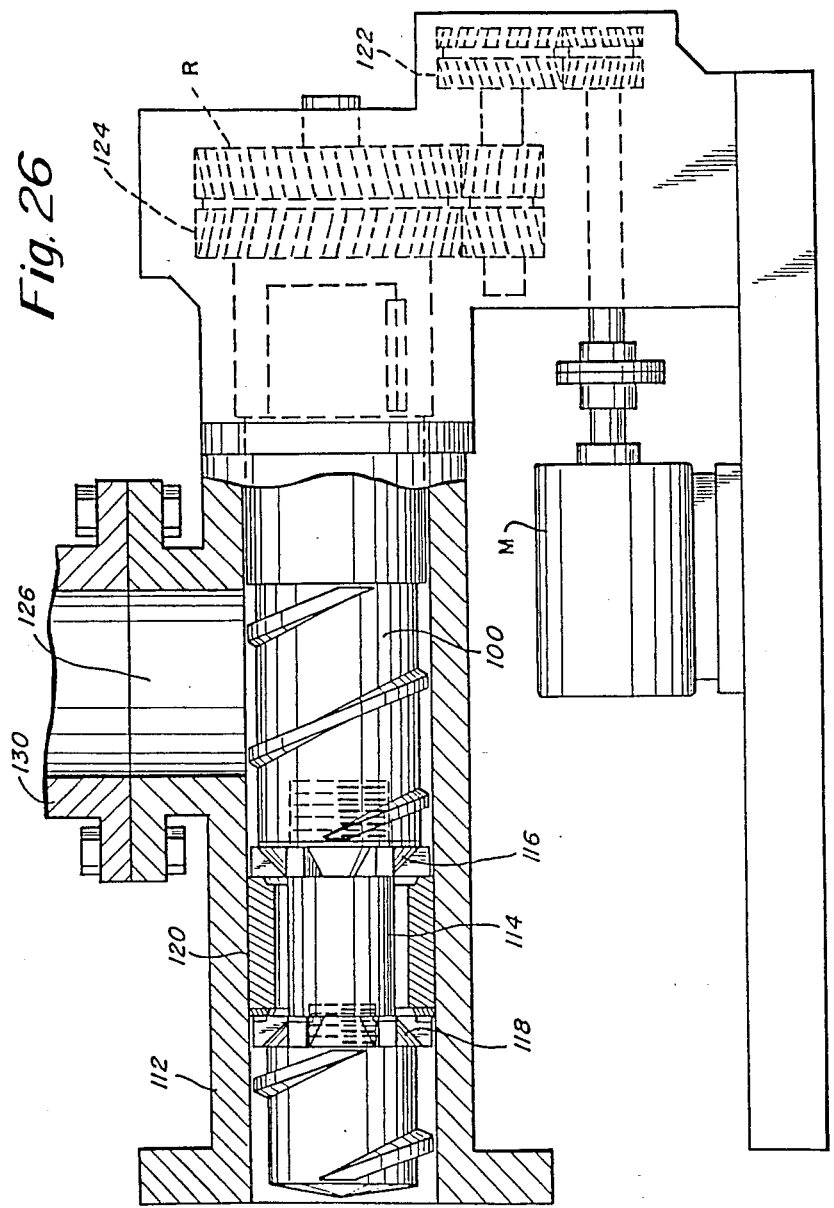
FIG. 26 is a side elevational view illustrating improved extruder mixing of the invention provided with independent drive means and connected to an extruder screw barrel.

In the modification of FIG. 26 there is illustrated a basic component assembly in which an extruder member 110 is received in a barrel 112 and drives a shaft 114 and affixed thereto are shear rings 116 and 118 arranged in abutting relation to opposite ends of a stationary sleeve 120. The stationary sleeve 120 has internally grooved surfaces similar to those illustrated in FIG. 4 and the shear rings also correspond to the shear rings as shown at the right hand side of FIG. 4. The extruder member 110 is provided with variable speed drive means including a motor M and reduction gears as 122 and 124. At one side the barrel 112 is formed with an inlet port 126 which is clamped to extruder barrel 130. The extruded material introduced through the inlet port onto the extruder member 110 is advanced through the stationary sleeve and shear ring assembly in the manner earlier described.

Figure 27:
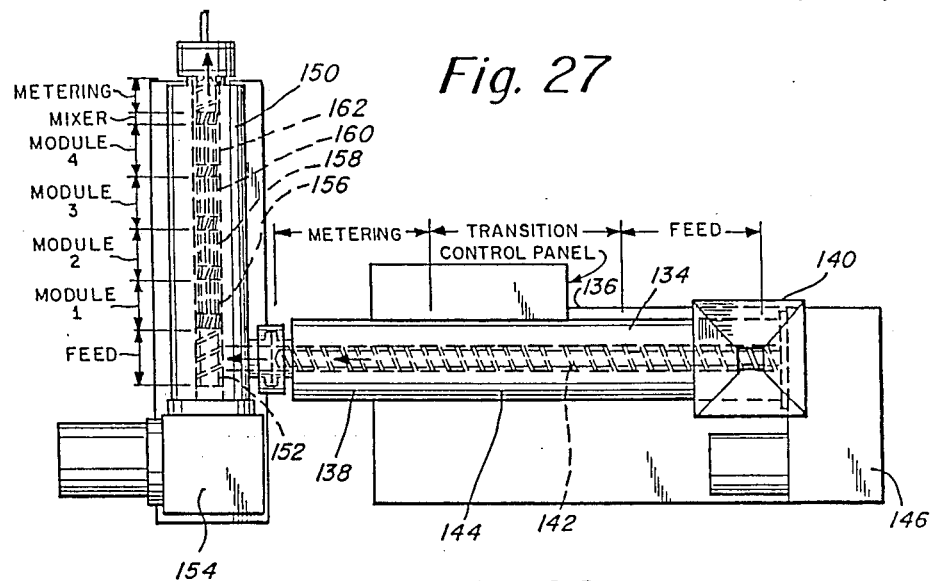
FIG. 27 is a plan view of the structure shown in FIG. 26.
Figure 28:
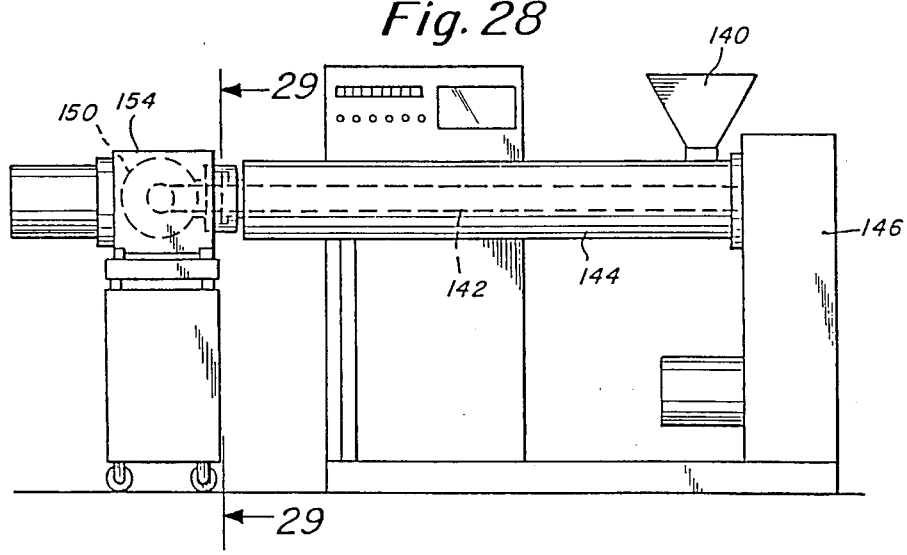
FIG. 28 is another view of the structure shown in FIG. 27.
Figure 29:
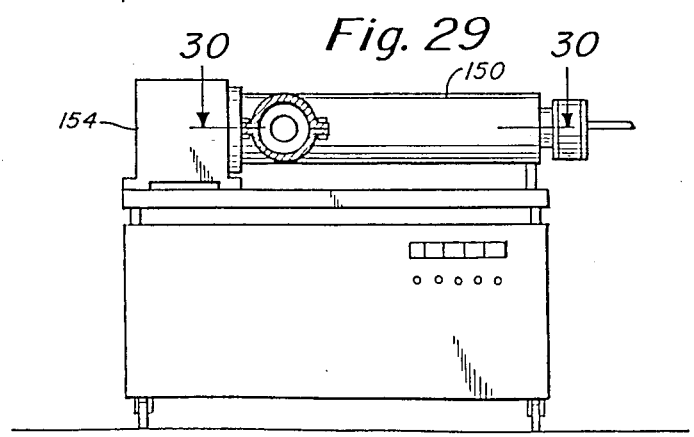
FIG. 29 is a detail end elevational view.

In FIGS. 27–29 there is illustrated a typical extruder screw and barrel assembly including a feed section 134, a transition control section 136 and a metering section 138. These sections are of the customary form in detailing with many extruded materials. A hopper 140 provides for feeding materials to be mixed into an extruder screw 142 in a barrel 144 which is activated by power driving means 146.

The mixing apparatus of the invention is clamped to the extremity of barrel 144 as viewed in FIGS. 27 and 28 and includes a barrel 150 having an extruder member 152 arranged to receive extruded material from screw 142. It will be noted that the extruder member 152 extends substantially at right angles to the extruder screw 142 and barrel 144 and includes independent drive means 154 which is operable to drive a pluarlity of modules denoted by numerals 156, 158, 160 and 162, also shown on a larger scale in FIG. 30.

Figure 30:
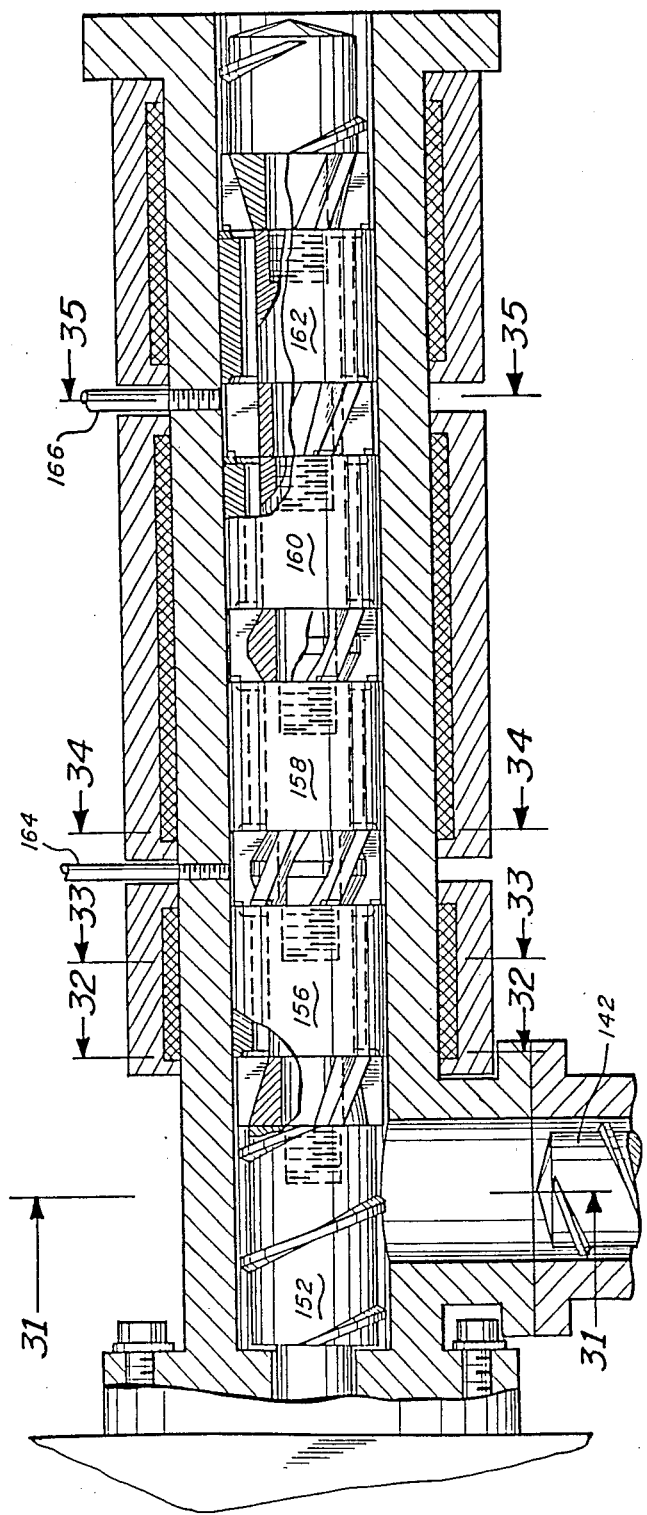
FIG. 30 is a cross sectional view of the mixing apparatus of the invention provided with a plurality of modules and connected to a separate extruder barrel of the disclosed in FIGS. 1-23.
Figure 31:
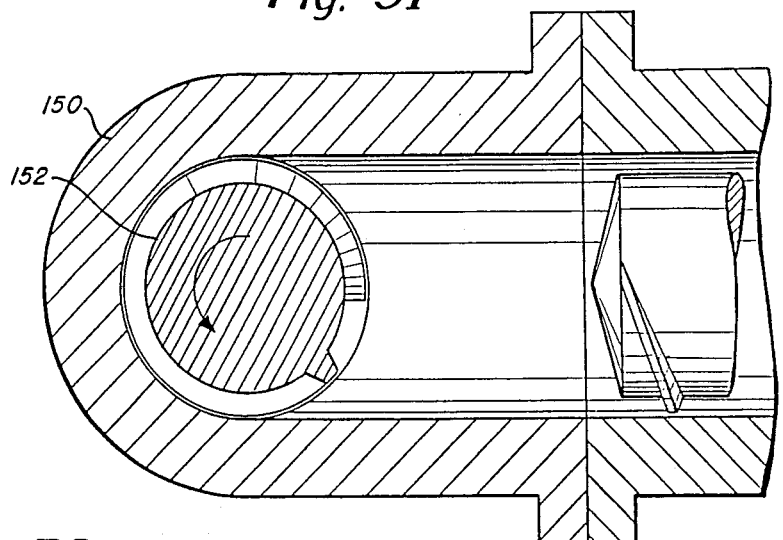
FIG. 31 is a cross section taken on the line 31—31 of FIG. 30.
Figure 32:
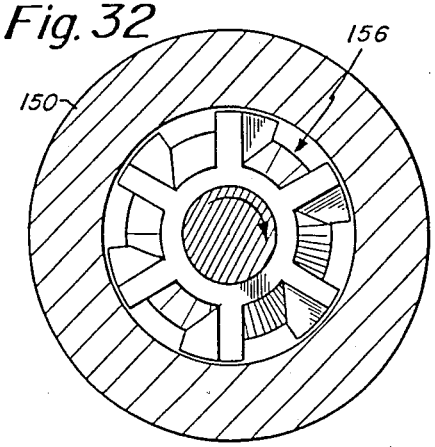
FIG. 32 is a cross section taken on the line 32—32 of FIG. 30.
Figure 33:
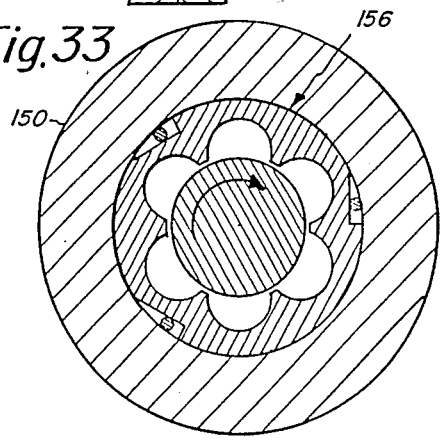
FIG. 33 is a cross section taken on the line 33—33 of FIG. 30.
Figure 34:
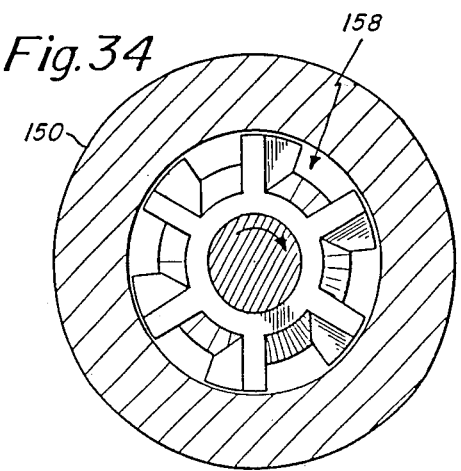
FIG. 34 is a detail cross sectional view.
Figure 35:
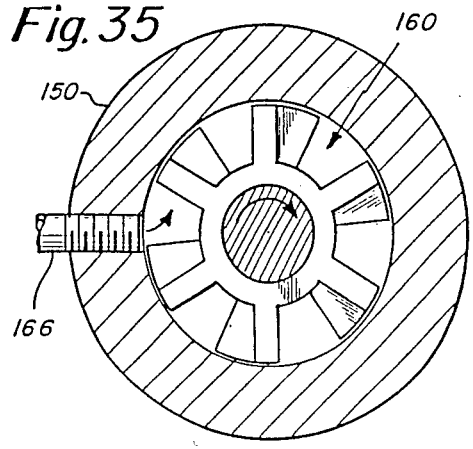
FIG. 35 is another detail cross sectional view taken on the line 35—35 of FIG. 30.

An important feature of the mixing apparatus of FIG. 30 is the provision of low pressure feed inlets 164 and 166 which may be employed to introduce materials into any one of the mixing modules 156, 158, 160 and 162 and these materials may be efficiently mixed together by using greater rotating speeds, higher temperatures and variable pressures such as will affect the operation of the main extruder screw.

By the use of independent drive means it also becomes feasible to vary the root diameter of the extruder sections. By reducing the root diameter of a given section various advantages may be realized. A reduced diameter means lower pressure which means low infeed pressure, instead of high pressure infeed which requires gear pumps.

Figure 36:
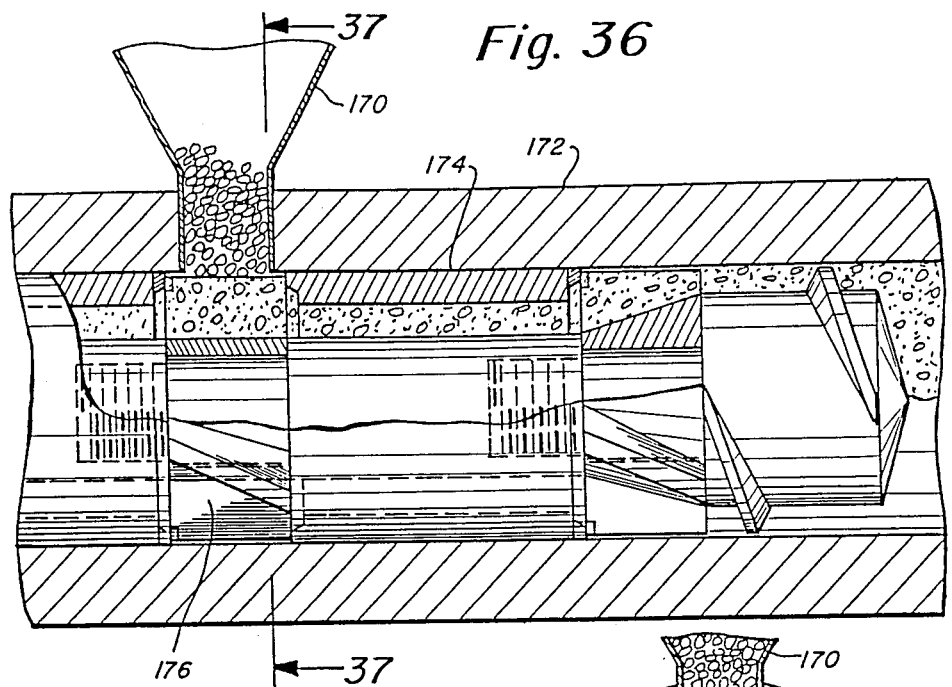
FIG. 36 is a fragmentary cross sectional view of improved mixing apparatus of the invention provided with lower pressure hopper means.
Figure 37:
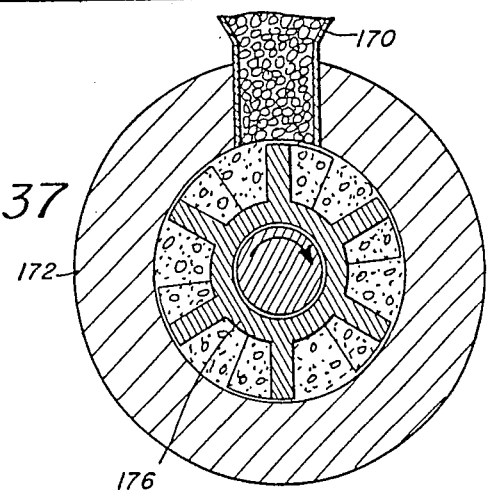
FIG. 37 is a cross sectional view taken on the line 37—37 of FIG. 36.

In FIGS. 36 and 37 an independently driven extruder 176 is mounted in a barrel 172 having a stationary sleeve 174 therein. Numeral 170 denotes a hopper which is arranged to introduce relatively large particles of a material which is difficult to introduce in a standard extruder screw. The material is applied to the extruder prior to entering the sleeve 174, which may be advantageous with some additives.

Figure 38:
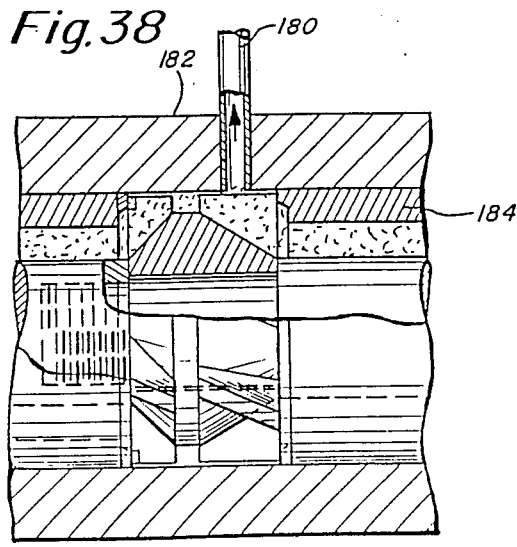
FIG. 38 is a detail cross sectional view illustrating a devolatizing port.

In FIG. 38 there is illustrated production in an independently driven extruder of a devolitizing post 182 located through a barrel 182 at a point where gases may form.

FIGS. 39 and 40 illustrate a kneading module combined with a barrel 190 having an independently driven extruder 198. An inlet post 200 receives extruded materials from a barrel 204 of a conventional extruder screw assembly.

Figure 41:
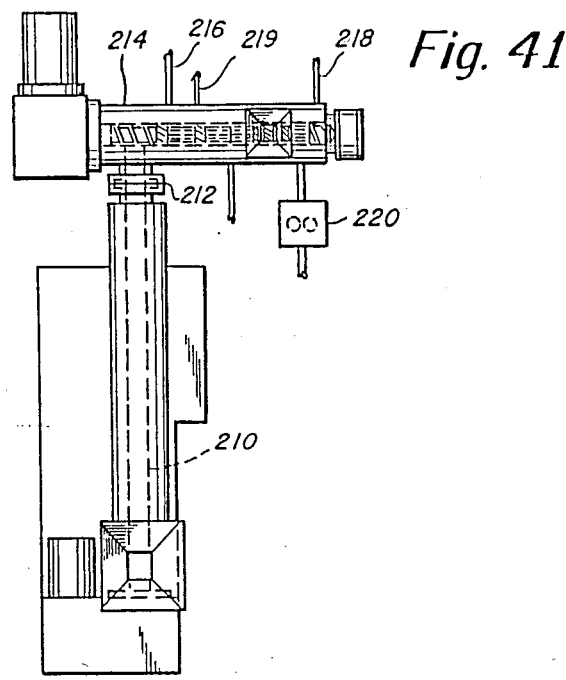
FIG. 41 is a plan view illustrating another form of mixing module apparatus with special gear pump.

FIG. 41 shows an extruder screw 210 coupled to an extruder 214 through a coupling 212. FIG. 41 also illustrates the combination of feed means as 216 for low pressure additives with a gear pump 220. Also illustrated are temperature probes as 218 219. The hopper provides for adding solid additives directly in front of the gear pump 220.

Figure 42:
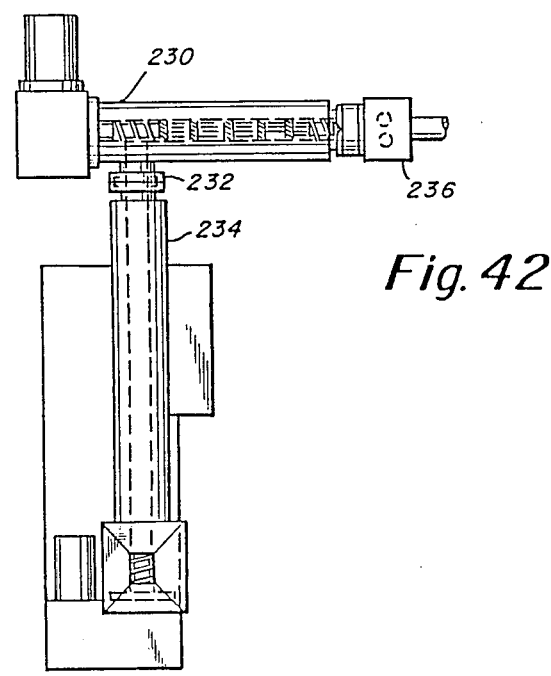
FIG. 42 is a schematic view illustrating still another form of mixing apparatus with special gear pump.

FIG. 42 illustrates another gear pump 236 for use with an extruder 230 which is independently driven to receive material from an extruder 234 through a coupling 232.

FIGS. 43 and 44 illustrate an extruder screw for receiving additives in a hopper 248 and advancing extruded material through an angularly exposed conduit 244 clamped to the end of 246 in a position to drive extruded material through a coupling 242 into a barrel 240 in which are received independently driven modules as suggested in broken lines.

I claim:

1. An improved modular mixing apparatus including a barrel and extruder member for moving extruded material through the barrel, sleeve means located around the extruder member in spaced relation thereto, said sleeve means being formed with internally grooved surfaces extending between the ends of the sleeve means, said sleeve means being recessed to provide at least one annular channel which intersects the internally grooved surfaces substantially at right angles thereto and said extruder member being formed with shearing lugs engageable in the annular channel for cutting off streams of extruded material passing through the sleeve means.

2. The invention of claim 1 including extruder means for introducing extruded material to the barrel.

3. The invention of claim 2 in which the extruder means comprises a power driven extruder screw and the mixing apparatus includes means for driving the extruder member in the barrel independently of the power driven extruder screw.

4. The invention of claim 1 including inlet means for introducing additives where the extruded material approaches the stationary sleeve means.

5. The invention of claim 1 wherein the shear ring lugs are semicircular in shape.

6. The invention of claim 1 wherein the internally grooved surface has cylindrical grooves therein.

7. Improved modular mixing apparatus for extruded materials, said apparatus including a barrel, an extruder member for moving extruded material through the barrel in a helical path of flow, stationary sleeve means located around the extruder member in spaced relation thereto, shear ring elements rotatable with the extruder and occurring in abutting relationship to opposite ends of the stationary sleeve means, said shear ring elements having spaced apart shearing blades and said stationary sleeve means being formed with internally grooved surfaces, said sleeve means being recessed to provide at least one annular channel which intersects the internally grooved surfaces substantially at right angles thereto and said extruder member being formed with shearing lugs engageable in the annular channel for cutting off streams of extruded material passing through the stationary sleeve means.

8. The invention of claim 7 in which the extruder member is connected to a power driven extruder screw and includes means for being driven independently of the power driven screw.

9. The invention of claim 7 wherein the shear ring lugs are semicircular in shape.

10. Improved modular mixing apparatus including a barrel and extruder member for moving extruded thermoplastic material through the barrel, the barrel being formed with internally grooved surfaces having axially extending cylindrical grooves, each groove extending axially relative to the screw and each groove being cylindrically shaped, and having at least one annular channel which intersects the internally grooved surfaces and a rotating shearing member engageable in the annular channel for cutting off streams of extruded material passing through the cylindrical grooves.

11. A mixing apparatus as claimed in claim 10 wherein the shearing member comprises circular lugs engageable in the annular channel.

12. A mixing apparatus as claimed in claim 11 further comprising shearing elements rotatable with the extruder and occurring in abutting relationship to opposite ends of the cylindrical grooves.

* * * * *